United States Patent
Reiff et al.

(10) Patent No.: US 10,392,026 B2
(45) Date of Patent: Aug. 27, 2019

(54) METHOD FOR CONTROLLING AT LEAST ONE COMPONENT OF A MOTOR VEHICLE

(71) Applicant: DAIMLER AG, Stuttgart (DE)

(72) Inventors: Markus Reiff, Esslingen (DE);
Wolfgang Renz, Stuttgart (DE);
Thomas Stolk, Kirchheim (DE);
Alexander Von Gaisberg-Helfenberg, Beilstein (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/062,885

(22) PCT Filed: Nov. 18, 2016

(86) PCT No.: PCT/EP2016/001935
§ 371 (c)(1),
(2) Date: Jun. 15, 2018

(87) PCT Pub. No.: WO2017/102050
PCT Pub. Date: Jun. 22, 2017

(65) Prior Publication Data
US 2018/0370539 A1    Dec. 27, 2018

(30) Foreign Application Priority Data
Dec. 17, 2015    (DE) .......................... 10 2015 016 442

(51) Int. Cl.
*B60W 50/00*    (2006.01)
*B60K 28/06*    (2006.01)
(Continued)

(52) U.S. Cl.
CPC ..... *B60W 50/0098* (2013.01); *B60H 1/00764* (2013.01); *B60K 28/06* (2013.01);
(Continued)

(58) Field of Classification Search
None
See application file for complete search history.

(56) References Cited

U.S. PATENT DOCUMENTS

| 6,278,362 | B1 | 8/2001 | Yoshikawa et al. |
| 6,985,073 | B1 * | 1/2006 | Doan ............... B60Q 1/525 |
| | | | 340/425.5 |

(Continued)

FOREIGN PATENT DOCUMENTS

| DE | 19600938 A1 | 8/1996 |
| DE | 102004034748 A1 | 2/2006 |

(Continued)

OTHER PUBLICATIONS

International Search Report dated Feb. 16, 2017 in related International Application No. PCT/EP2016/001935.

(Continued)

*Primary Examiner* — Richard M Camby
(74) *Attorney, Agent, or Firm* — Patent Portfolio Builders PLLC

(57) ABSTRACT

A method for controlling at least one component of a motor vehicle, involves determining a current driving profile of the motor vehicle using at least one sensor present in the motor vehicle and comparing the current driving profile to a stored reference driving profile. At least two different components are simultaneously controlled depending on a result of this comparison.

13 Claims, 1 Drawing Sheet

(51) Int. Cl.
*B60Q 3/80* (2017.01)
*B60Q 3/70* (2017.01)
*B60Q 3/60* (2017.01)
*B60H 1/00* (2006.01)
*B60W 10/30* (2006.01)
*B60W 40/08* (2012.01)

(52) U.S. Cl.
CPC ............... *B60Q 3/60* (2017.02); *B60Q 3/70* (2017.02); *B60Q 3/80* (2017.02); *B60W 10/30* (2013.01); *B60W 40/08* (2013.01); *B60W 2040/0818* (2013.01); *B60W 2040/0827* (2013.01); *B60W 2540/18* (2013.01); *B60W 2540/26* (2013.01); *B60W 2710/30* (2013.01)

(56) References Cited

U.S. PATENT DOCUMENTS

| | | | |
|---|---|---|---|
| 8,593,288 B2 | 11/2013 | Schmitz et al. | |
| 8,717,197 B2* | 5/2014 | Rathmacher | G01C 21/3697 340/937 |
| 8,731,739 B2* | 5/2014 | Yamada | B60W 40/08 340/439 |
| 9,505,402 B2* | 11/2016 | Fung | B60K 28/06 |
| 2004/0252020 A1 | 12/2004 | Matsumoto et al. | |
| 2012/0212353 A1 | 8/2012 | Fung et al. | |

FOREIGN PATENT DOCUMENTS

| | | |
|---|---|---|
| DE | 102005057267 A1 | 6/2007 |
| DE | 102011013777 A1 | 11/2011 |
| DE | 102013011188 A1 | 2/2014 |
| DE | 102013016817 A1 | 4/2015 |
| EP | 2942012 A1 | 11/2015 |
| JP | H06107032 A | 4/1994 |

OTHER PUBLICATIONS

Written Opinion dated Feb. 16, 2017 in related International Application No. PCT/EP2016/001935.

* cited by examiner

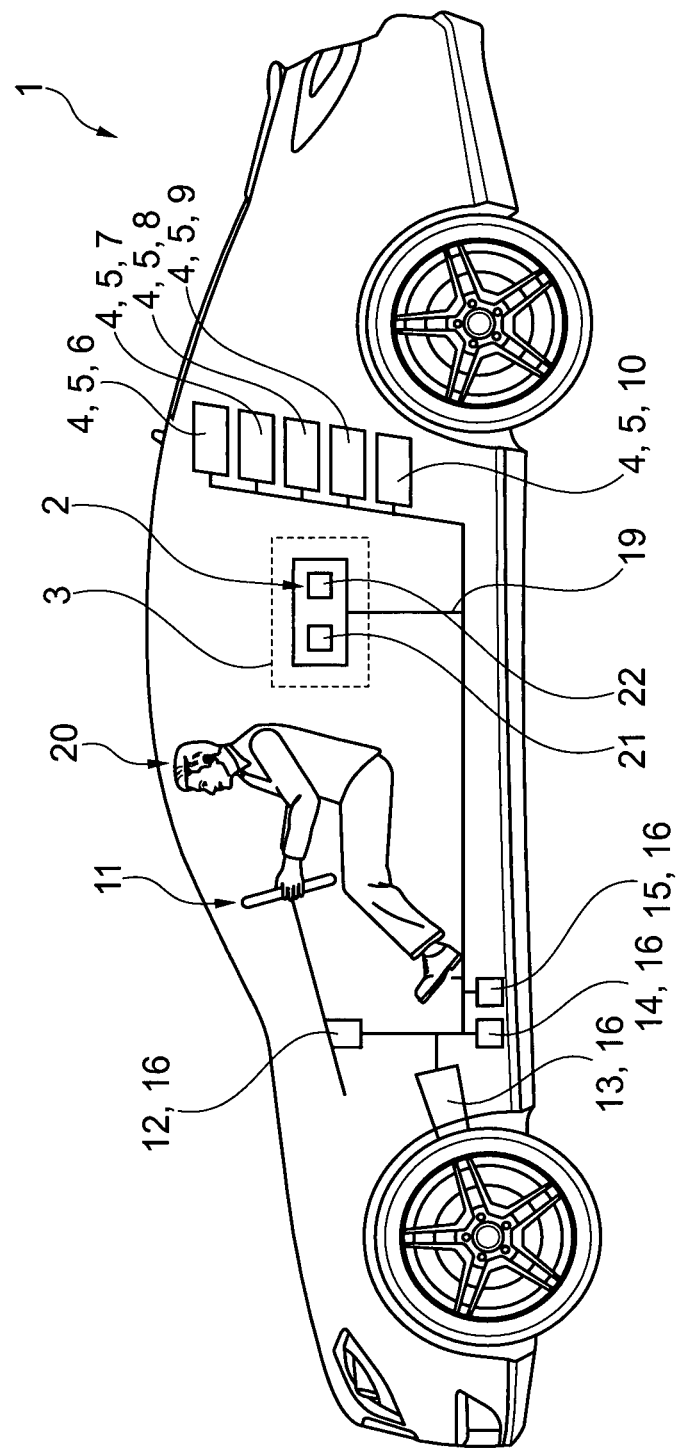

METHOD FOR CONTROLLING AT LEAST ONE COMPONENT OF A MOTOR VEHICLE

BACKGROUND AND SUMMARY OF THE INVENTION

Exemplary embodiments of the invention relate to a method for controlling at least one component of a motor vehicle and a motor vehicle having a control apparatus which is set up/programmed to carry out this method.

German patent document DE 10 2011 013 777 A1 discusses a motor vehicle having at least two illuminants arranged in the interior of the motor vehicle, the light color of which being adjustable. A sensor device records measuring data. Audio data is included in this measuring data, the audio data being able to be measured and displayed by means of a microphone installed in the interior of the motor vehicle. A control device evaluates the recorded measuring data by means of an evaluation unit. The control device adjusts the light color of the at least two illuminants separately depending on the evaluation.

German patent document DE 2013 016 817 A1 discusses an internal lighting system for an interior of a vehicle. This comprises one or more light sources. A first sensor means records an illumination strength and a color temperature of a surrounding light that shines into the interior from outside the vehicle. A second sensor records an illumination strength and a color temperature in the interior of the vehicle. A control means serves to control the illumination strength and the color temperature of the light sources depending on the two recorded illumination strengths and color temperatures.

German patent document DE 10 2013 011 188 A1 describes a motor vehicle having at least two illuminants distributed in the interior of the motor vehicle whose light color can be adjusted. A sensor device enables the recording of measuring data. These measuring data are analyzed by an analysis unit arranged in a control apparatus. The control apparatus adjusts the light color of the at least two illuminants depending on the evaluation of the evaluation unit. Color information about a graphic depiction can be detected as measuring data, the depiction being reproduced on a display installed in the motor vehicle.

German patent document DE 196 00 938 A1 discusses a vehicle state monitoring device for motor vehicles. Behavior parameters are recorded by the monitoring device, which relate to a yaw or lateral movement of the motor vehicle, and are compared to a reference behavior parameter. A lateral deviation behavior magnitude is determined on the basis of the behavior parameter, the reference behavior parameter and the vehicle speed, on the basis of which lateral deviation behavior magnitude it is, in turn, decided whether or not the vehicle state of the driver is normal. In case of the latter, several warnings, such as an acoustic buzzer and a warning lamp, for example, can be activated.

German patent document DE 10 2004 034 748 A1 discusses a driver assistance system for recognizing fatigue and/or assessing attentiveness. A possible fatigue of the driver is here ascertained by determining the necessary amount of correction procedures in order to set a desired driving direction.

Exemplary embodiments of the present invention are directed to an improved method and a device for carrying out this method, by means of which the driving behavior of the driver of a motor vehicle, in particular, various aspects relevant to safety, can be influenced.

The basic idea of the invention is thus to influence the driving behavior of the driver of a motor vehicle to the effect that the driving profile of the motor vehicle approaches a predetermined reference driving profile in the sense of a regulation mechanism in which the driver is included. In this way, for example, in the event of occurrences of fatigue of the driver, unfavorable or undesirable driving behavior of the driver, in particular in terms of safety aspects, can be prevented or these can be at least counteracted.

To do so, in the method according to the invention, at least two components of the motor vehicle, by means of which components the driving behavior of a driver of the motor vehicle can be influenced, are controlled in combination and depending on the result of a comparison of a current driving profile of the motor vehicle with a stored reference driving profile. To determine the current driving profile, at least one sensor is used by means of which a measured variable of the driving profile characterizing the driving profile can be established. This measured variable can, for example, be a current steering angle of the motor vehicle, which is set by the driver and can be measured by means of a steering angle sensor.

Because the actual current driving profile of the motor vehicle depends on the driving behavior of the driver, the comparison permits conclusions about the current driving behavior of the driver. If the stored reference driving profile corresponds to a desirable, ideal driving behavior of the driver and if the comparison shows a determined deviation of the current, actual driving profile from the reference driving profile, then it can be concluded from this, for example, that occurrences of fatigue are noticeable with the driver. As a result of corresponding control of the component, this can be counteracted. If the controllable component is, for example, an interior illumination of the interior of the motor vehicle, then the interior illumination can be used to counteract the fatigue of the driver. To do so, the light color, for example, of the interior illumination can be chosen in such a way that this is perceived by the driver as a warning signal against imminent fatigue or fatigue that has already emerged. In addition, fresh air can be blown into the interior of the motor vehicle by means of the air-conditioning system. The two measures in combination counteract occurrences of fatigue of the motor vehicle particularly effectively. As a result, the driver can correspondingly adjust his driving behavior, whereby the driving profile of the motor vehicle is changed in turn, and indeed ideally to the effect that its deviation from the stored reference driving profile decreases.

In the method according to the invention for controlling at least two components of a motor vehicle, a current driving profile of the motor vehicle is determined by using at least one sensor present in the motor vehicle. Subsequently, the driving profile established is compared to at least one stored reference profile. Depending on the result of this comparison, the at least two components are simultaneously controlled.

In a preferred embodiment, the at least one measured variable can be influenced by a driver during the driving operation of the motor vehicle. This ensures the driver is part of the regulation mechanism described above, such that the actual driving profile of the motor vehicle is extensively adjusted to the stored reference profile, in the ideal case even completely adjusted, by adjusting the driving behavior of the driver.

Particularly preferably, the at least two components are two different comfort systems of the motor vehicle or are each a part of two different comfort systems. It is clear that three or more components can also be controlled in an advantageous development of the method according to the invention, wherein each component can be an individual comfort system of the motor vehicle. An air-conditioning system for blowing air-conditioned and tempered fresh air into the vehicle interior, an air-balance system for ionizing the fresh air, an entertainment system having an audio system for playing music in the vehicle interior and an interior illumination provided in the vehicle interior, in particular, can come into consideration as such comfort systems. As a result of the interaction of at least two of the comfort systems mentioned above, the fatigue of the driver can be counteracted particularly effectively.

In a further preferred embodiment, a degree of fatigue of the driver is determined by the comparison of the established driving profile with the reference driving profile. This can preferably occur in such a way that a current driving profile value is allocated to the actual current driving profile as part of the method according to the invention. In a corresponding manner, a reference driving profile value can be allocated to the stored reference driving profile. As a result of the comparison of the two values, i.e., of the driving profile value and the reference driving profile value, in particular as a result of a simple subtraction, the degree of fatigue of the driver can be defined and ascertained.

Particularly preferably, the at least two components are formed in such a way that the degree of fatigue of the driver can be progressively reduced by the at least two components. This means that the fatigue of the driver can be counteracted with higher effectiveness than with individual consideration of the at least two components as a result of the combined interaction of two components because of emerging synergy effects.

In a further preferred embodiment, the driving profile comprises at least one measured variable that can be determined by the sensor. In particular, the speed of the motor vehicle, which can be measured by means of a speed sensor, and a steering angle of the motor vehicle, which can be set by the driver by means of the steering wheel and can be determined by means of a steering angle sensor, can be considered as measured variables. Additional measured variables can include a longitudinal acceleration and a lateral acceleration of the motor vehicle, which can be measured by an acceleration sensor formed as a longitudinal acceleration sensor or lateral acceleration sensor.

In a further preferred embodiment, the at least one sensor and the at least one component communicate with a control apparatus provided in the motor vehicle via a common fieldbus, the method according to the invention is carried out in the control apparatus. This enables the method according to the invention to be carried out by means of the equipment in the motor vehicle, the equipment typically being already present in mass production. The provision of additional components for carrying out the method can thus be avoided in this variant. Significant additional costs in the production of the motor vehicle can thus be extensively avoided. The communication connection can preferably take place with the aid of a fieldbus provided in the motor vehicle, in particular a CAN or LIN bus.

Furthermore, the invention relates to a motor vehicle having a control apparatus and at least two components that can be controlled by this control apparatus. Additionally, the motor vehicle comprises at least one sensor for determining a current driving profile of the motor vehicle. According to the invention, the control apparatus is set up/programmed to carry out the method described above.

Further important features and advantages of the invention result from the drawing and the corresponding description of the figures by means of the drawing.

It is understood that the features that are named above and are still to be illustrated below are not only able to be used in the respectively specified combination, but also in other combinations or individually, without exceeding the scope of the present invention.

Preferred exemplary embodiments of the invention are depicted in the drawing and are explained in more detail in the description below.

BRIEF DESCRIPTION OF THE DRAWING FIGURE

FIG. 1 illustrates a schematic depiction of a motor vehicle according to an embodiment.

DETAILED DESCRIPTION

The sole FIGURE, FIG. 1, illustrates a schematic depiction of an example of a motor vehicle 1 according to the invention. The motor vehicle 1 comprises a control apparatus 2, which can be part of an anti-fatigue assistant system 3 of the motor vehicle 1. Furthermore, the motor vehicle 1 comprises several components 4, in the example scenario in the form of comfort systems 5 by means of which the driving comfort perceived by occupants of the motor vehicle 1, including the driver 20, can be influenced and, in particular, improved. The components 4 or comfort systems 5 and also the control apparatus 2 are crosslinked with one another via a fieldbus 19 present in the motor vehicle 1, preferably via a CAN or LIN bus, such that the components 4 or comfort systems 5 can be controlled by the control apparatus 2 of the anti-fatigue assistant system 3. It is understood that the individual components 4 or comfort systems 5 can each have individual control apparatuses that are coupled to the fieldbus 19.

In the exemplary scenario, an air-conditioning system 6 for blowing air-conditioned and tempered fresh air into the vehicle interior, an air-balance system 7 for ionizing the fresh air, an entertainment system having an audio system 9 for playing music in the vehicle interior and an interior illumination provided in the vehicle interior are included as the comfort systems 5.

The control apparatus 2 comprises a control apparatus 21 and a storage unit 22 and is set up/programmed to carry out the method according to the invention.

Furthermore, several sensors 16 are installed in the motor vehicle 1, such as a steering angle sensor 12 for determining a current steering angle set by the driver 20 in a manual steering wheel 11. A further sensor 16 is formed as a speed sensor 13 by means of which a current speed of the motor vehicle 1 can be determined. A further sensor 16 is formed as a longitudinal acceleration sensor 14, by means of which a current acceleration of the motor vehicle 1 in its longitudinal direction can be determined. Finally, a further sensor can be formed as a lateral acceleration sensor 15, by means of which a current acceleration of the motor vehicle 1 in its lateral direction can be determined, i.e., perpendicular to the longitudinal direction. All sensors 16 are coupled to the fieldbus 19 and, in this way, can communicate with the control apparatus 2. A commonality of the measured variables is that they can be influenced by the driver 20 of the motor vehicle 1 during the driving operation. A current driving profile of the motor vehicle 1 can be established by means of the sensors 16. The driving profile depends on the driving behavior of the motor vehicle 1, as to how the motor vehicle 1 is influenced by the driver 20 at that time.

In terms of establishing the concretely technical realization of the driving profile, various possibilities are presented to the person skilled in the art. For example, a procedure in which a classification of the current driving profile as "sporty", "defensive", "driver fatigue probable", inter alia, is carried out depending on current speed or current acceleration in the longitudinal and lateral direction and depending on steering behavior of the motor vehicle 1 is possible. The determination of the driving profile here takes place by analyzing the sensor data provided by the sensors 16 and transferred to the control apparatus 2 via the fieldbus 19. The determination of the driving profile 2 is carried out in the control apparatus 21 of the control apparatus 2. The driving profile established by the control apparatus 2 is compared to several reference driving profiles stored in the storage unit 22. Such reference driving profiles can be, for example, reference profiles that reproduce a sporty or defensive driving style. Particularly preferably, a reference profile can be stored, the reference profile corresponding to the "ideal" driving behavior of the driver 20. In the regulation mechanism realized by the method according to the invention, this reference driving profile corresponds to an intended target driving profile.

In the method according to the invention, at least two of the present components 4 are controlled in combination by the control apparatus 2 depending on the result of this comparison. Thus, the interior illumination 10 in terms of illumination brightness and color profile and depending simultaneously, the amount and temperature of the fresh air blowing into the interior can be simultaneously changed, for example.

Here, it is conceivable to set a reference profile that corresponds to an ideal driving manner of the driver. If the comparison of the reference driving profile with the actual determined driving profile now shows that ideal driving behavior is not present because the driver is fatigued, then this can be counteracted with the aid of the interior illumination 10 and the air-conditioning system 6. It is conceivable, for example, for a lighting color or lighting brightness perceived by the driver as a "wake-up signal" or warning signal to be chosen. At the same time, the temperature of the fresh air blown into the vehicle interior can be decreased. This can lead to a change of the driving behavior of the driver 20 to the effect that the actual driving profile of the motor vehicle 1 adjusts to the reference driving profile.

Alternatively or additionally, it is conceivable to increase the ionization degree of the fresh air introduced into the vehicle interior by means of the air-balance system 7 in addition to the control of the air-conditioning system 6 and/or the interior illumination 10. Furthermore, it can be thought to also control the entertainment system 8 having the audio system 9 in a suitable manner, for example by the volume of the music playing in the vehicle interior at that moment being increased. This measure can also be perceived by the driver as a warning signal against imminent fatigue or fatigue that has already emerged. A commonality of the previously mentioned components 4 is that the driving behavior of the driver 20 and, via this, the driving profile of the motor vehicle 1 can be particularly effectively influenced by said components 4 in the event of combined control. Preferably, the driving behavior is influenced by the control of the at least two components 4 to the effect that the current emerging driving profile of the motor vehicle 1 approaches the stored reference driving profile or, in an ideal case, even complies with this. In this case, the method presented here follows the functioning principle of a regulator in which the driver of the motor vehicle is included.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for controlling at least two components of a motor vehicle, the method comprising:
   measuring, using at least one sensor of the motor vehicle, a variable of a driving behavior of the motor vehicle;
   determining, based on the variable measured by the at least one sensor, a current driving profile of the motor vehicle;
   comparing the current driving profile to a stored reference driving profile; and
   simultaneously controlling the at least two different components depending on a result of the comparison,
   wherein the at least two components include an interior illumination of the vehicle and an air-conditioning system of the motor vehicle,
   wherein a light color of the interior illumination is changed when a result of the comparison indicates a driver of the vehicle is fatigued,
   wherein the air-conditioning system blows fresh air into an interior of the motor vehicle when a result of the comparison indicates a driver of the vehicle is fatigued, and
   wherein the blowing of fresh air by the air-conditioning system and the changing of the light color of the interior illumination is controlled in such a way that the driving behavior of a driver of the vehicle is controllable by interaction of the blowing of fresh air by the air-conditioning system and the changing of the light color of the interior illumination and a driving profile of the motor vehicle is influenceable via the driving behavior.

2. The method of claim 1, wherein a degree of fatigue of a driver of the vehicle is determined by the comparison of the current driving profile with the stored reference driving profile.

3. The method of claim 1, wherein the at least two components are two different comfort systems of the motor vehicle.

4. The method of claim 1, wherein the measured variable is influenceable by a driver of the motor vehicle during a driving operation of the motor vehicle.

5. The method of claim 1, wherein the at least one sensor and the at least two components communicate with a controller in the motor vehicle via a common fieldbus, and wherein controller performs the method.

6. A motor vehicle, comprising:
   a controller;

at least two components that are controllable by the controller, wherein the at least two components include an interior illumination of the motor vehicle and an air-conditioning system of the motor vehicle;

at least one sensor configured to establish a current driving profile of the motor vehicle, wherein the controller is configured to measure, using the at least one sensor of the motor vehicle, a variable of a driving behavior of the motor vehicle;

determine, based on the variable measured by the at least one sensor, a current driving profile of the motor vehicle;

compare the current driving profile to a stored reference driving profile; and simultaneously control the at least two different components depending on a result of the comparison, wherein a light color of the interior illumination is changed when a result of the comparison indicates a driver of the vehicle is fatigued, wherein the air-conditioning system blows fresh air into an interior of the motor vehicle when a result of the comparison indicates a driver of the vehicle is fatigued, and wherein the at least two components are formed in such a way that a degree of fatigue of a driver can be reduced by the at least two components.

7. The motor vehicle of claim 6, wherein the at least one measured variable is influenceable by a driver during the driving operation of the motor vehicle.

8. The method of claim 1, wherein an illumination brightness of the interior illumination is changed in addition to the light color.

9. The method of claim 8, wherein the current driving profile is determined based on current speed or current acceleration in a longitudinal and lateral direction and based on steering behavior of the motor vehicle.

10. The method of claim 8, wherein the current driving profile is compared to a plurality of reference driving profiles.

11. The motor vehicle of claim 6, wherein an illumination brightness of the interior illumination is changed in addition to the light color.

12. The motor vehicle of claim 11, wherein the current driving profile is determined based on current speed or current acceleration in a longitudinal and lateral direction and based on steering behavior of the motor vehicle.

13. The motor vehicle of claim 11, wherein the current driving profile is compared to a plurality of reference driving profiles.

* * * * *